US012739537B2

(12) United States Patent
Kim

(10) Patent No.: US 12,739,537 B2
(45) Date of Patent: Sep. 15, 2026

(54) ANALOG-DIGITAL CONVERTER AND IMAGE SENSOR INCLUDING THE SAME

(71) Applicant: Samsung Electronics Co., Ltd., Suwon-si (KR)

(72) Inventor: Sungyong Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 9 days.

(21) Appl. No.: 19/018,460

(22) Filed: Jan. 13, 2025

(65) Prior Publication Data

US 2025/0380068 A1 Dec. 11, 2025

(30) Foreign Application Priority Data

Jun. 5, 2024 (KR) ........................ 10-2024-0073927

(51) Int. Cl.
*H04N 25/78* (2023.01)
*H04N 25/76* (2023.01)

(52) U.S. Cl.
CPC ......... *H04N 25/78* (2023.01); *H04N 25/7795* (2023.01)

(58) Field of Classification Search
CPC .. H04N 25/78; H04N 25/7795; H04N 25/772; H03K 23/005
See application file for complete search history.

(56) References Cited

U.S. PATENT DOCUMENTS 9,467,636 B2 10/2016 Nakamura et al.
9,621,169 B2 * 4/2017 Liu ......................... H03L 7/099
9,787,932 B2 10/2017 Totsuka et al.
10,334,195 B2 * 6/2019 Saeki .................. H03K 23/005
10,382,051 B2 8/2019 Matsuzawa et al.
11,317,047 B2 * 4/2022 Han ..................... H03K 23/005
11,445,142 B2 9/2022 Kim
2015/0244376 A1 * 8/2015 Liu ........................... H03L 7/18 327/156
2016/0249004 A1 * 8/2016 Saeki .................. H03K 23/005

(Continued)

FOREIGN PATENT DOCUMENTS

CN 115150573 A 10/2022
JP 6132506 B2 5/2017

(Continued)

*Primary Examiner* — Nicholas G Giles
(74) *Attorney, Agent, or Firm* — Fish & Richardson P.C.

(57) ABSTRACT

An image sensor according to some example embodiments includes a pixel array outputting a pixel signal, a detection circuit determining a comparison result signal based on a reference signal and the pixel signal and outputting the comparison result signal, an analog-to-digital converter outputting a count result signal based on the comparison result signal, and a sense amplifier outputting an image signal based on the count result signal, the analog-digital converter including a divider generating a divided reference clock signal by dividing a reference clock signal, a delay circuit generating a first gray code signal by delaying the divided reference clock signal, a code generator generating second gray code signals having different periods from the first gray code signal based on the divided reference clock signal, and a delay control circuit providing a delay control signal that controls a delay time of the divided reference clock signal to the delay circuit.

20 Claims, 14 Drawing Sheets

(56) References Cited

U.S. PATENT DOCUMENTS

| | | | | |
|---|---|---|---|---|
| 2021/0160450 | A1* | 5/2021 | Han | ..................... H03K 23/005 |
| 2023/0199345 | A1 | 6/2023 | Kim et al. | |

FOREIGN PATENT DOCUMENTS

| | | | |
|---|---|---|---|
| JP | 6674224 | B2 | 4/2020 |
| KR | 10-2021-0065675 | A | 6/2021 |
| KR | 10-2022-0045352 | A | 4/2022 |
| KR | 10-2023-0094416 | A | 6/2023 |

* cited by examiner iCLK
d = d1+d2
G<0>
G<1>
G<2>
G<3>
G<4>
G<5>
T
T
2T
4T
8T
16T
16T
dcq1
dcq2
dcq3
dcq4
dcq5
t0
t1

FIG. 8A

ANALOG-DIGITAL CONVERTER AND IMAGE SENSOR INCLUDING THE SAME

CROSS-REFERENCE TO RELATED APPLICATION

This application is based on and claims priority under 35 U.S.C. § 119 to Korean Patent Application No. 10-2024-0073927, filed on Jun. 5, 2024, in the Korean Intellectual Property Office, the disclosure of which is incorporated by reference herein in its entirety.

BACKGROUND

The inventive concepts relate to image sensors, and more particularly, to analog-to-digital converters and image sensors including the same.

Counters are used to convert valid physical quantities such as light intensity, sound intensity, and time into digital signals. For example, an image sensor is a device that acquires an image by utilizing the properties of a semiconductor that reacts to incident light. An analog-digital converter (hereinafter, ADC) may be used to convert an analog signal output from a pixel array of an image sensor into a digital signal. The ADC may be implemented using a counter that performs a counting operation using a clock signal.

In a situation when the ADC conversion time should be maintained or reduced for higher speed operation, securing High Dynamic Range (HDR) function would be beneficial. In order to secure HDR function, the resolution of the ADC may be increased by increasing the number of output bits of the ADC, but increasing the number of output bits of the ADC may increase the ADC conversion time.

SUMMARY

The inventive concepts provide analog-to-digital converters and image sensors including the same, the analog-to-digital converter improving the resolution of count values while reducing or minimizing an increase in ADC conversion time by increasing a counting speed.

According to some aspects of the inventive concepts, there is provided an image sensor including a pixel array configured to output a pixel signal, a detection circuit configured to determine a comparison result signal based on a reference signal and the pixel signal and output the comparison result signal, a gray code generator configured to generate a plurality of gray code signals based on an input clock signal, and a counter circuit configured to output a digital count result signal by counting the comparison result signals based on the plurality of gray code signals, the gray code generator including a delay circuit configured to generate a first gray code signal by delaying the input clock signal, a code generator configured to generate a plurality of second gray code signals having a different period from the first gray code signal based on the input clock signal, and a delay control circuit configured to provide a delay control signal controlling a delay time of the input clock signal to the delay circuit.

According to some aspects of the inventive concepts, there is provided an analog-digital converter including a gray code generator configured to generate a first gray code signal and a plurality of second gray code signals, and a counter circuit configured to output a digital count result signal by counting a comparison result signal between a pixel signal and a reference signal based on the first gray code signal and the plurality of second gray code signals, the gray code generator including a delay circuit configured to generate the first gray code signal by delaying an input clock signal, a code generator configured to generate a plurality of second gray code signals having different periods from the first gray code signal based on the input clock signal, and a delay control circuit configured to provide a delay control signal for controlling a delay time of the input clock signal to the delay circuit.

According to some aspects of the inventive concepts, there is provided an image process system including an image sensor configured to generate a comparison result signal based on a pixel signal and a reference signal, generate a digital count result signal based on the comparison result signal, and output an image signal based on the count result signal, and an image processor configured to process the image signal, the image sensor further configured to generate an input clock signal, generate a delay control signal that controls a delay time of the input clock signal in a delay-locked loop manner, generate a first gray code signal by delaying the input clock signal based on the delay control signal, generate a plurality of second gray code signals having a different period from the first gray code signal based on the input clock signal, and generate the digital count result signal by counting the comparison result signal based on the first gray code signal and the plurality of second gray code signals.

BRIEF DESCRIPTION OF THE DRAWINGS

Embodiments will be more clearly understood from the following detailed description taken in conjunction with the accompanying drawings in which:

FIGS. 8A and 8B are diagrams explaining a delay control circuit according to some example embodiments;

DETAILED DESCRIPTION

Hereinafter, some example embodiments of the inventive concepts will be described in detail with reference to the accompanying drawings.

Figure 1:
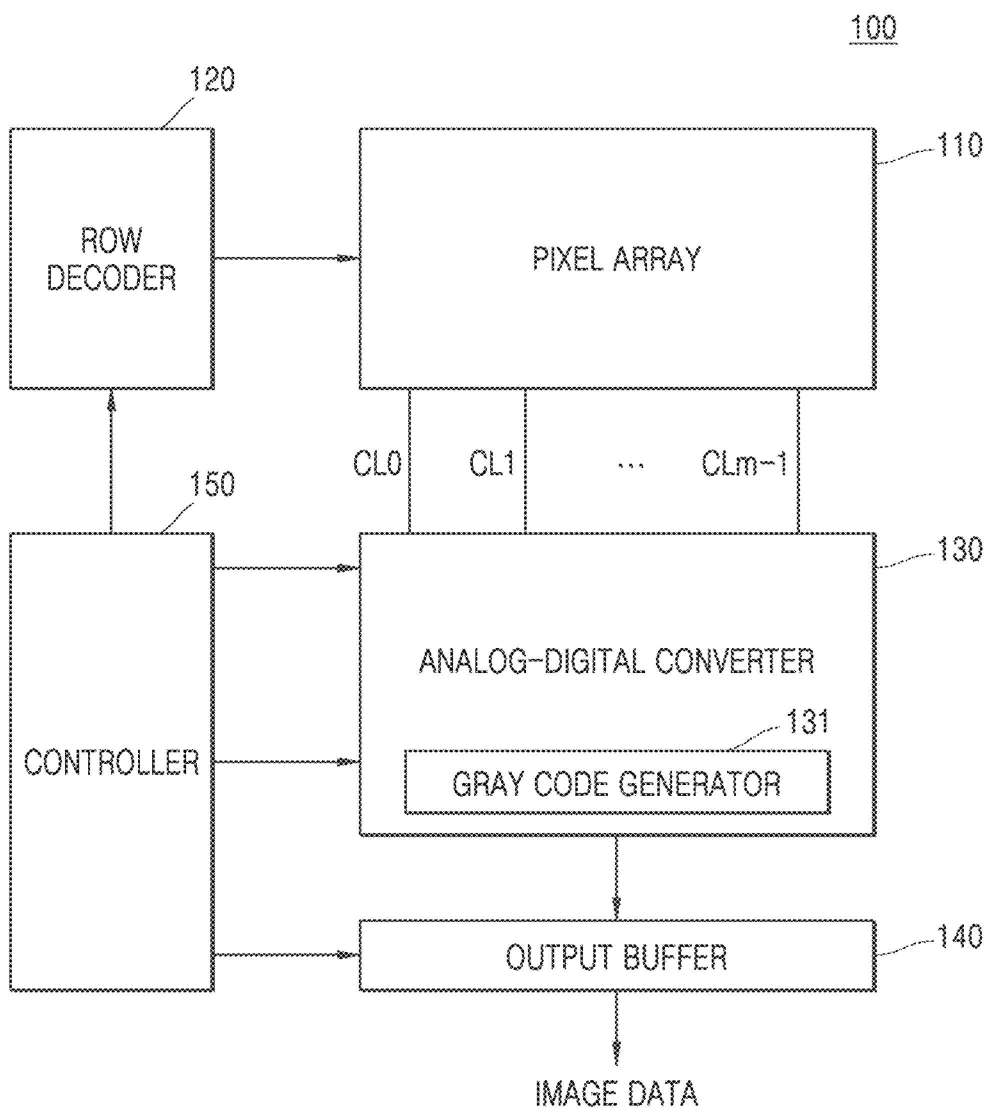
FIG. 1 is a block diagram showing an image sensor according to some example embodiments.

FIG. 1 is a block diagram showing an image sensor 100 according to some example embodiments. Referring to FIG. 1, the image sensor 100 includes a pixel array 110, a row decoder 120, an analog-to-digital converter (ADC), 130, an output buffer 140, and a controller 150. The ADC 130 may also be referred to as a readout circuit.

The pixel array 110 includes a plurality of pixel sensors arranged two-dimensionally. Each of the pixel sensors converts an optical signal into an electrical signal. The pixel array 110 may be driven by driving signals such as a selection signal SEL, a reset signal RG, and a transmission signal TG provided from the row decoder 120. In addition, an electric signal sensed by each pixel in response to the driving signals is provided to the ADC 130 through a plurality of column lines CL0, CL1, . . . and CLm-1. A pixel sensor may include a single photoelectric conversion element (e.g., a photodiode).

The row decoder 120 may select one row of the pixel array 110 under the control of the controller 150. The row decoder 120 generates a selection signal SEL to select one row among a plurality of rows. Then, the row decoder 120 sequentially activates a reset signal RG and a transmission signal TG with respect to pixels corresponding to the selected row. Then, an analog form reset component signal RESET and an image component signal SIG generated from each of the active pixel sensors of the selected row will be sequentially transmitted to the ADC 130.

The ADC 130 may generate a digital signal based on a double correlation sampling operation for an analog signal of the pixel array 110. Specifically, the ADC 130 sequentially samples and holds the reset component signal RESET and the image component signal SIG provided to each of the plurality of column lines CL0, CL1, . . . and CLm-1 from the pixel array 110. That is, the ADC 130 samples and holds levels of the reset component signal RESET and the image component signal SIG corresponding to each of the columns. Then, the ADC 130 converts the pixel signal for each of the columns into a digital signal and outputs it. The ADC 130 according to some example embodiments may count the reset component signal RESET and the image component signal SIG using the gray code signals generated by a gray code generator 131. The gray code generator 131 according to some example embodiments may generate a plurality of gray code signals (for example, G<n:0> of FIG. 4). The gray code generator 131 may generate one of the plurality of gray code signals (for example, G<0>) by delaying an input clock signal (for example, iCLK of FIG. 4) by ¼ period of the input clock signal. The gray code generator 131 may include a delay control circuit (for example, 740 of FIG. 6) and a delay circuit (for example, 730 of FIG. 6). The delay control circuit 740 may include a delay-lock loop circuit. The delay control circuit 740 may generate a delay code (for example, DCON of FIG. 6) so that the delay time corresponds to ¼ period of an input clock signal and may provide the delay code DCON to the delay circuit 730. The delay circuit 730 may generate a gray code signal by delaying the input clock signal based on the delay code DCON. The structure of the gray code generator 131 may be described with reference to FIG. 6, and a method of generating the gray code may be described with reference to FIGS. 7 to 9.

The output buffer 140 latches and outputs image data of each column unit provided by the ADC 130. The output buffer 140 may temporarily store image data output from the ADC 130 under the control of the controller 150, and then sequentially outputs the latched image data. Here, the output buffer 140 may or may not be included in the image sensor 100.

The controller 160 controls the pixel array 110, the row decoder 120, the ADC 130, and the output buffer 140. The controller 150 may supply control signals such as a clock signal and a timing control signal beneficial for the operation of the pixel array 110, the row decoder 120, the ADC 130, and the output buffer 140. The controller 160 may include a logic control circuit, a phase lock loop (PLL) circuit, a timing control circuit, and/or a communication interface circuit.

Figure 2:
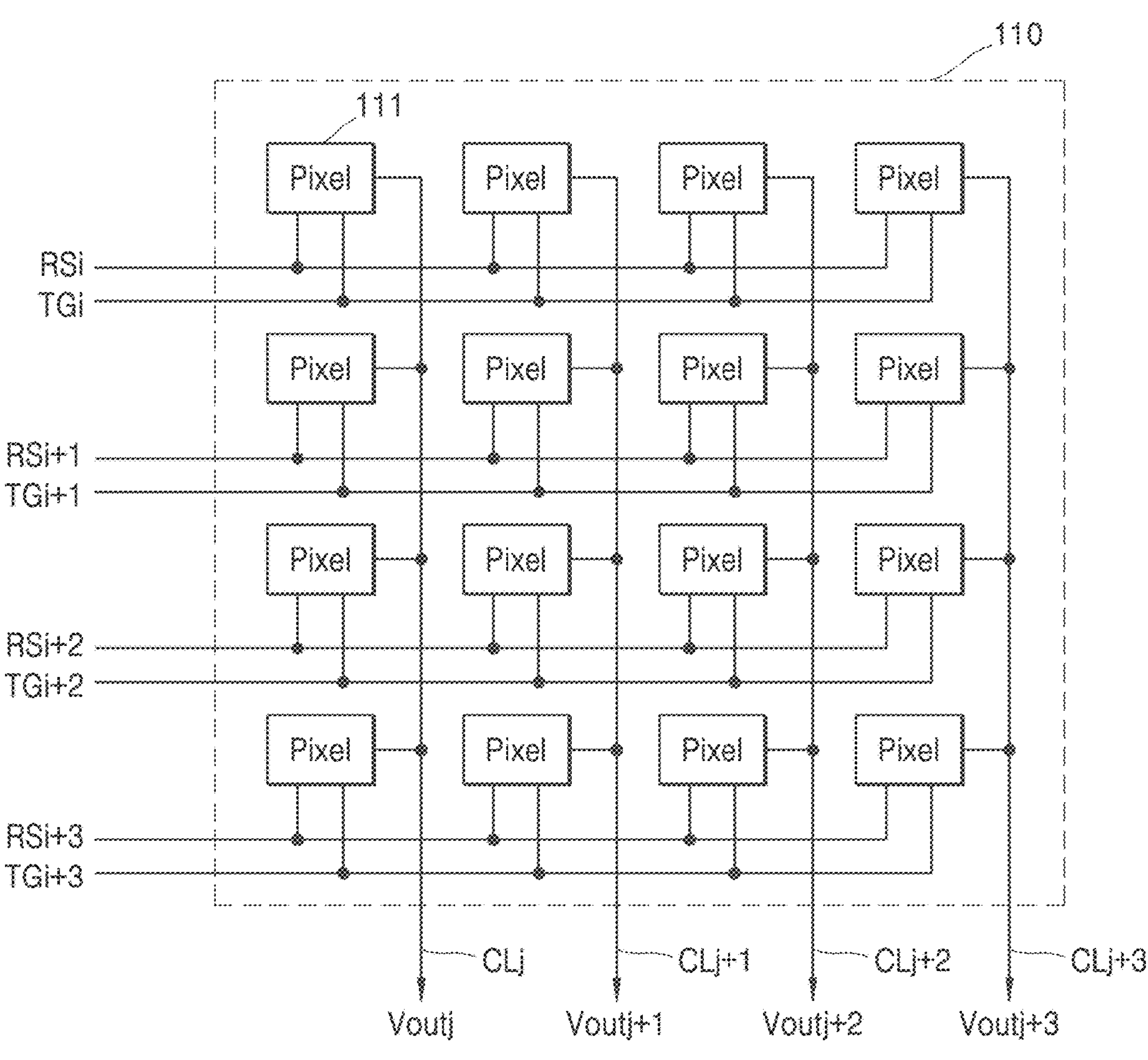
FIG. 2 is a block diagram showing a pixel array according to some example embodiments.

FIG. 2 is a block diagram showing a pixel array according to some example embodiments. Referring to FIG. 2, the pixel array 110 includes pixel sensors arranged in a matrix form of multiple rows and columns.

Each of the pixel sensors of the pixel array 110 may include at least one of a red filter, a green filter, and/or a blue filter. The red filter passes light in a red wavelength band, the green filter passes light in a green wavelength band, and the blue filter passes light in a blue wavelength band. In addition, the pixel sensor 111 may include a plurality of transistors and photoelectric conversion elements. Each of the plurality of pixel sensors 111 detects light using a photoelectric conversion element, converts the light into an electrical signal, and outputs the electrical signal through the column lines CL. In addition, in order to apply a reset multi-sampling technique, the pixel sensor 111 may be provided with a structure including at least two photoelectric conversion elements.

If a reset signal RS_i and a transmission signal TG_i are provided for a selected row i in the pixel array 110, pixel signals Vout_j, Vout_j+1, Vout_j+2, and Vout_j+3 corresponding to the reset signal RS_i and the transmission signal TG_i may be output to each column line CLj of the selected row. The pixel signals Vout_j, Vout_j+1, Vout_j+2, and Vout_j+3 will be provided to the ADC 130 and may be sampled as a reset component signal RESET and an image component signal SIG, respectively.

Figure 3:
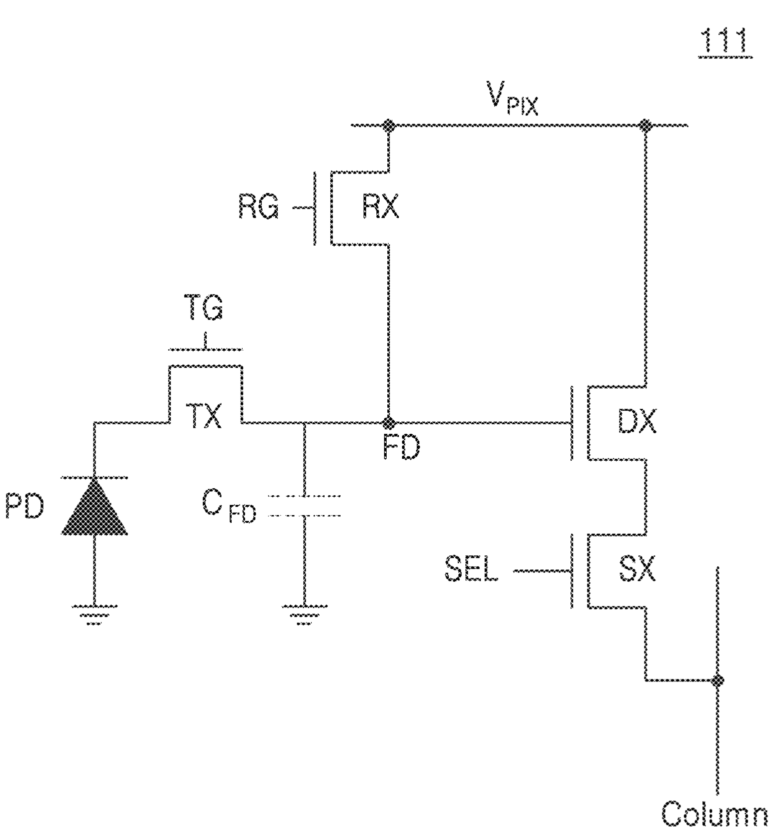
FIG. 3 is a circuit diagram showing a configuration of one pixel sensor shown in FIG. 2.

FIG. 3 is a circuit diagram showing a configuration of one pixel sensor illustrated in FIG. 2. Referring to FIG. 3, the pixel sensor 111 may be implemented with a structure including one photoelectric conversion element PD and four NMOS transistors TX, RX, DX, and SX. However, it will be well understood that the pixel sensor 111 may further include additional transistors or capacitances for various functions.

The photoelectric conversion element PD may be a light-sensitive element that generates and accumulates charges according to the amount of incident light or the intensity of light. The photoelectric conversion element PD may be implemented with a photo diode, a photo transistor, a photo gate, a pinned photo diode PPD, etc.

The transfer transistor TX transfers charges accumulated in the photoelectric conversion element PD to a floating diffusion region FD. The transfer transistor TX may generally be composed of one transistor and is switched in response to a transfer signal TG_i provided from the row decoder 120.

The floating diffusion region FD has a function of detecting a charge corresponding to the amount of incident light. The floating diffusion region FD accumulates the charge provided from the photoelectric conversion element PD during the time when the transmission signal TG_i is activated.

To accumulate charge, the floating diffusion region FD may have a capacity CFD of a certain size. The floating diffusion region FD is connected to a gate terminal of a drive transistor DX driven by a source follower amplifier. The floating diffusion region FD may receive a power supply voltage VDD by a reset transistor RX.

The reset transistor RX resets the floating diffusion region FD in response to a reset signal RS_i. A source of the reset transistor RX is connected to the floating diffusion region FD, and a drain is connected to the power supply voltage VDD. If the reset transistor RX is turned on by a bias provided by a reset signal RS_i, the power supply voltage VDD connected to the drain of the reset transistor RX is transferred to the floating diffusion region FD. Then, the charge accumulated in the floating diffusion region FD moves to the power supply voltage VDD terminal, and the voltage of the floating diffusion region FD is reset.

The drive transistor DX acts as a source follower amplifier, amplifies the change in an electric potential of the floating diffusion region FD, and outputs the electric potential as a sensing voltage Vout_j through an output line.

The selection transistor SX selects a pixel sensor to be read in a row unit. The selection transistor SX is driven by a selection signal SEL provided in a row unit. If the selection transistor SX is turned on, a potential of the floating diffusion region FD may be amplified and transmitted to the drain of the selection transistor SX through the drive transistor DX. The drive signal lines TG_i, RS_i, SEL of the transmission transistor TX, the reset transistor RX, and the selection transistor SX extend in a row direction (horizontal direction) so that the unit pixels included in the same row are driven simultaneously.

Figure 4:
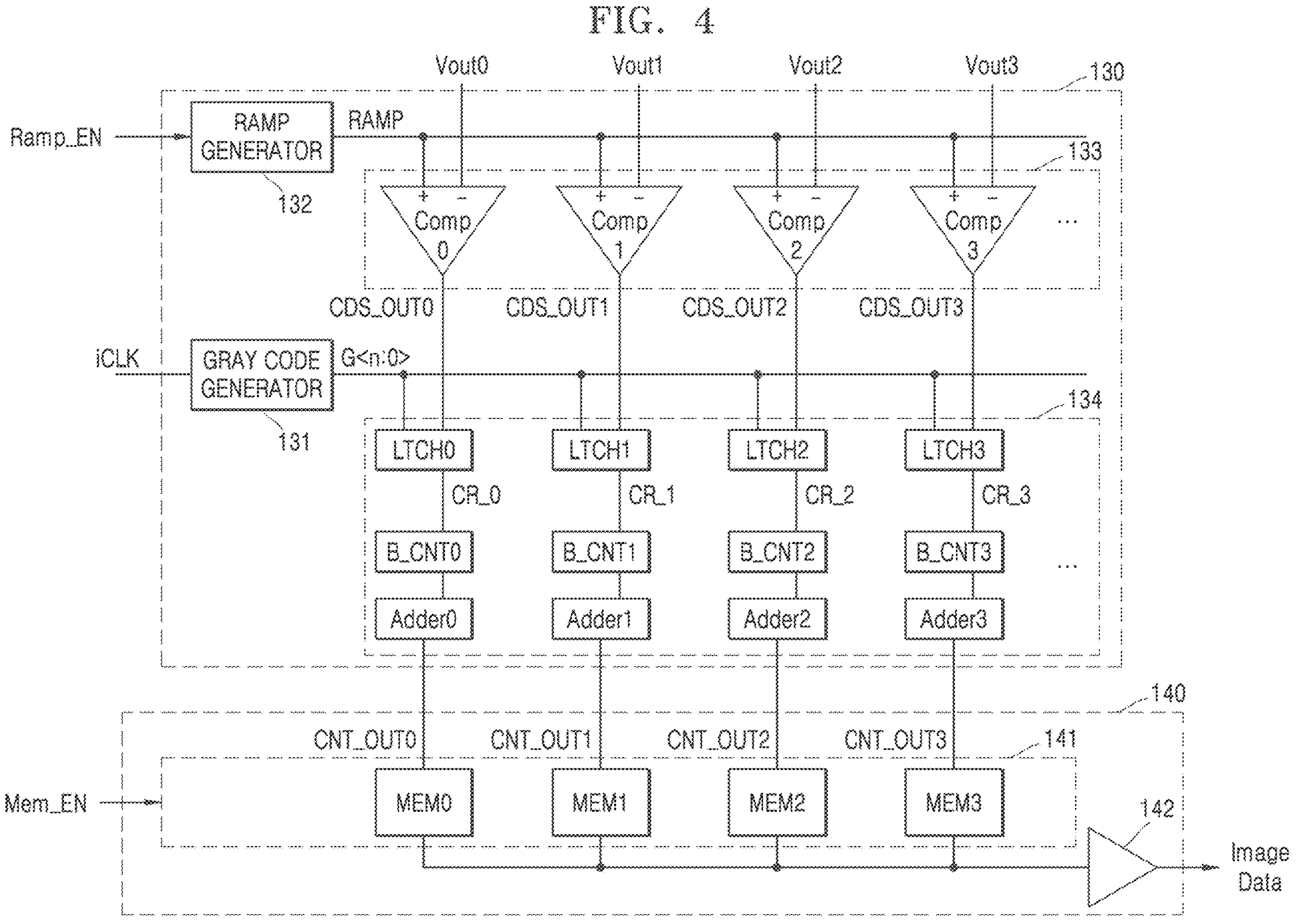
FIG. 4 is a block diagram showing a structure of an analog-to-digital converter (ADC) and an output buffer of FIG. 1.

FIG. 4 is a block diagram showing a structure of the ADC 130 and the output buffer 140 of FIG. 1. Referring to FIG. 4, the ADC 130 includes a gray code generator 131, a ramp signal generator 132, a comparator circuit 133, and a counter circuit 134. The output buffer 140 may include a column memory 141 including memories MEM_0, MEM_1, MEM_2, and MEM_3 and a sense amplifier 142. In some example embodiments, the sense amplifier 142 may not be included in the output buffer 140. In some example embodiments, the output buffer 140 may or may not be included in the image sensor 100 depending on the applied technology.

The ramp signal generator 132 outputs a ramp signal RAMP having a constant falling or rising slope in response to a control signal Ramp_EN from the controller 150. That is, the ramp signal generator 132 continuously generates a ramp signal RAMP having a slope (the slope may be, for example, a specific or determined slope) according to the control of the controller 150. A reset component signal RESET and an image component signal SIG included in the pixel signal are each converted into time axis length information through a comparison operation with the ramp signal RAMP.

The comparator circuit 133 includes a plurality of comparators Comp0, Comp1, Comp2, and Comp3 provided for each of the columns of the pixel array 110. The comparators Comp0, Comp1, Comp2, and Comp3 compare each of pixel signals Vout0, Vout1, Vout2, and Vout3 corresponding to the columns with the ramp signal RAMP. Here, each of the pixel signals Vout0, Vout1, Vout2, and Vout3 may include a reset component signal RESET and an image component signal SIG. The comparator circuit 133 may also be referred to as a detection circuit, and the plurality of comparators Comp0, Comp1, Comp2, and Comp3 may also be referred to as a plurality of detectors Comp0, Comp1, Comp2, and Comp3.

The comparison operation of the pixel signal Vout0 and the ramp signal RAMP by the first comparator Comp0 is as follows. The ramp signal RAMP is input to a non-inverting input terminal (+) of the first comparator Comp0, and the pixel signal Vout0 is input to the inverting input terminal (−) of the first comparator Comp0. The first comparator Comp0 compares the ramp signal RAMP with the reset component signal RESET of the pixel signal Vout0 in a first section and compares the ramp signal RAMP with the image component signal SIG of the pixel signal Vout0 in a second section following the first section, and outputs as a CDS output signal CDS_OUT0. Through this procedure, the reset component signal RESET and the image component signal SIG including the level information may be converted into time axis length information of the CDS output signal CDS_OUT0. The operating characteristics of the second to fourth comparators Comp1, Comp2, and Comp3 are the same or substantially the same as those of the first comparator Comp0, except that the columns they are responsible for are different, so the description thereof are omitted. That is, the comparator circuit 133 may be configured to output a CDS output signal (e.g., CDS_OUT0) based on the reset component signal RESET of the pixel signal (e.g., Vout0) and the ramp signal RAMP.

The counter circuit 134 includes a plurality of latches LTCH0, LTCH1, LTCH2, and LTCH3, a plurality of binary counters B_CNT0, B_CNT1, B_CNT2, and B_CNT3, and a plurality of adders Adder0, Adder1, Adder2, and Adder3. The gray code generator 131 generates a plurality of gray code signals G<n:0> based on an input clock signal iCLK provided from the controller 160. The plurality of gray code signals G<n:0> are count signals that are counted up or counted down in a gray code manner.

The plurality of latches LTCH0, LTCH1, LTCH2, and LTCH3 latch the counted lower bits of the CDS output signals CDS_OUT0 to CDS_OUT3 based on the plurality of gray code signals G<n:0>. For example, the latch LTCH0 may latch the plurality of gray code signals G<n:0> based on the CDS output signal CDS_OUT0. Furthermore, the plurality of latches LTCH0, LTCH1, LTCH2, and LTCH3 transfer the highest bits CR_0, CR_1, CR_2, and CR_3 of a counted gray code GC to the binary counters B_CNT0, B_CNT1, B_CNT2, and B_CNT3 of the corresponding columns, respectively. The highest bit of the gray code GC has the same bit value as the lowest bit of the binary code, for example, the highest bit of the gray code GC may generally have the same bit value as the lowest bit of the binary code. Therefore, each of the plurality of binary counters B_CNT0, B_CNT1, B_CNT2, and B_CNT3 counts the CDS output signals CDS_OUT0 to CDS_OUT3 in the form of counting up from the transmitted most significant bits CR_0, CR_1, CR_2, and CR_3. The plurality of adders Adder0, Adder1, Adder2, and Adder3 convert the gray code GC stored in the plurality of latches LTCH0, LTCH1, LTCH2, and LTCH3 into binary, add the binary to the counted value in the plurality of binary counters B_CNT0, B_CNT1, B_CNT2, and B_CNT3, and output the added value as an image data value of a final CDS output signal CDS_OUTj (where j=0, 1, 2, and 3). In some example embodiments, the image data value may be a value obtained by subtracting a count value of the reset component signal RESET from a count value of the image component signal SIG.

The counter circuit 134 may include an up/down counter and a bit-wise inversion counter. At this time, the bit-wise inversion counter may perform an operation similar to the up/down counter. For example, the bit-wise inversion counter may perform a function of performing only an up count and a function of inverting all bits inside the counter into l's complements upon receiving a (for example, specific or selected) signal input. The bit-wise inversion counter, after performing a reset count, may invert the reset count to l's complement, e.g., a negative value.

The column memory 141 may store image data corresponding to each column in response to a control signal Mem_EN from the controller 150. The column memory 141 may include a plurality of memories MEM_0, MEM_1, MEM_2, and MEM_3 that sequentially transmit image data stored in each thereof to the sense amplifier 142. As described above, it will be well understood that the configuration of the output buffer 140 may or may not be included in the image sensor 100 (see FIG. 1).

Figure 5:
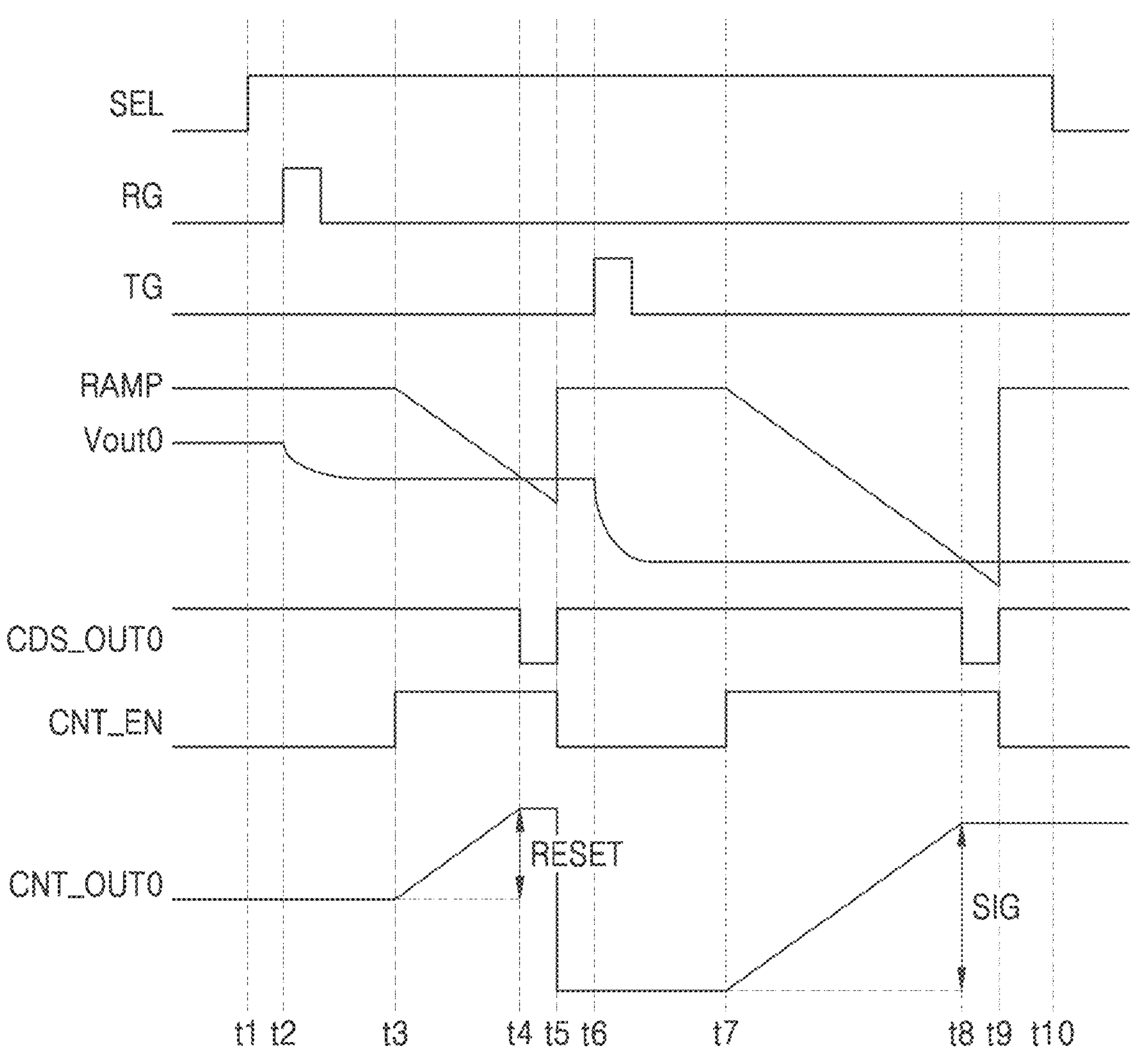
FIG. 5 is a timing diagram showing in detail an ADC conversion time period.

FIG. 5 is a timing diagram showing in detail the ADC conversion time period.

Referring to FIG. 5, during a time point t1 to a time point t10, the selection signal SEL has an activation level, for example, a logic high, and at this time, a count value of the reset component signal RESET and a count value of the image component signal SIG may be generated and stored.

If a reset control signal RG transits to an activation level, for example, to a logic high, the reset transistor RX may reset the floating diffusion region FD based on a power supply voltage VDD according to the reset control signal RG. The reset component signal RESET may be output as a pixel signal Vout. A ramp signal RAMP decreases from the time point t3 to the time point t5, and a count enable signal CNT_EN may have an activation level, for example, a logic high. The counter circuit 134 may count the reset component signal RESET based on a plurality of gray code signals G<n:0> when the count enable signal CNT_EN is a logic high. A count value based on the plurality of gray code signals G<n:0> may increase over time. The operation of counting the pixel signal Vout0 will be described later, but the content described later may also be applied to the pixel signals Vout1 to Vout3.

At time point t4, the ramp signal RAMP and the pixel signal Vout0 become substantially the same or the same, and thereafter, the ramp signal RAMP may become lower than the pixel signal Vout0. At time t4, an output of the comparator Comp0, e.g., the CDS output signal CDS_OUT0, may transition from a logic high to a logic low. The latch LTCH0 may sample the count value of the reset component signal RESET in response to a falling edge of the CDS output signal CDS_OUT0. At time t5, the ramp signal RAMP may be reset. The CDS output signal CDS_OUT0 may transition from a logic low to a logic high. At time t5, the counter circuit 134 may change a count value for the reset component signal RESET to a negative number with substantially the same or the same absolute value. Specifically, the counter circuit 134 may perform a function of inverting all internal bits to make them I's complement. That is, the counter circuit 134, after performing a reset count to obtain a count value for the reset component signal RESET, may invert the count value to a l's complement, e.g., a negative value.

Thereafter, at time t6, when the transmission control signal TG transitions to an activation level, for example, a logic high, the transmission transistor TX may transfer a photocharge to the floating diffusion region FD. The image component signal SIG corresponding to a voltage level of the floating diffusion region FD may be output as a pixel signal Vout0. For example, the pixel signal Vout0 may be reduced, and the pixel signal Vout0 may further be reduced to a lower level as the amount of light incident on the photodiode 11 increases.

From time point t7 to time point t9, the ramp signal RAMP decreases, and the count enable signal CNT_EN may have an activation level, for example, a logic high. The counter circuit 134 may count the image component signal SIG based on the plurality of gray code signals G<n:0> if the count enable signal (CNT_EN) is a logic high. The count value based on the plurality of gray code signals G<n:0> may increase as time passes.

At time point t8, the ramp signal RAMP and the pixel signal Vout0 become substantially the same or the same, and thereafter, the ramp signal RAMP may become lower than the pixel signal Vout0. At time t8, the CDS output signal CDS_OUT0 may transition from a logic high to a logic low. The latch LTCH0 may sample a count value of the image component signal SIG in response to the falling edge of the CDS output signal CDS_OUT0. As a result, the reset component signal RESET and the image component signal SIG are sampled in the pixel PX, and a count value of the reset component signal RESET and a count value of the image component signal SIG are generated, and the count value of the reset component signal RESET and the count value of the image component signal SIG may be held in the latch LTCH0.

At time t7, the counter circuit 134 may start counting from a negative number having an absolute value of the count value of the reset component signal RESET. As a result, at time t8, the count value of the count result signal CNT_OUT0 may be the count value of the image component signal SIG. Here, the count result signal CNT_OUT0 may be data corresponding to 11 bits or 12 bits.

According to some example embodiments, the gray code generator 131 may improve the counting speed by generating a gray code signal G<0> having substantially the same or the same frequency as the input clock signal (e.g., iCLK) and a phase delayed by ¼ of the period of the input clock signal. That is, by additionally using a gray code signal having a high frequency (e.g., a higher frequency than the input clock signal), the resolution of the count value indicated by the count result signal CNT_OUT0) may be increased within substantially the same or the same time.

In FIG. 5, it is depicted that the count value of the count result signal CNT_OUT0 increases with a constant slope, but in some example embodiments, the count value of the count result signal CNT_OUT0 may increase in, e.g., a stepwise manner. According to some example embodiments, by additionally using a gray code signal having a high frequency (e.g., a higher frequency than the input clock signal), the unit step of the count value becomes denser, and thus the resolution of the count value may be increased. For example, according to some example embodiments, there may be an increase in speed, accuracy, and/or power efficiency of the image sensor based on the above methods. Therefore, the improved devices and methods overcome the deficiencies of the conventional devices and methods while reducing resource consumption, and/or improving data accuracy and/or resource allocation (e.g., latency). Further, there is an improvement in user experience and/or image capture in the device by providing the improved process.

Figure 6:
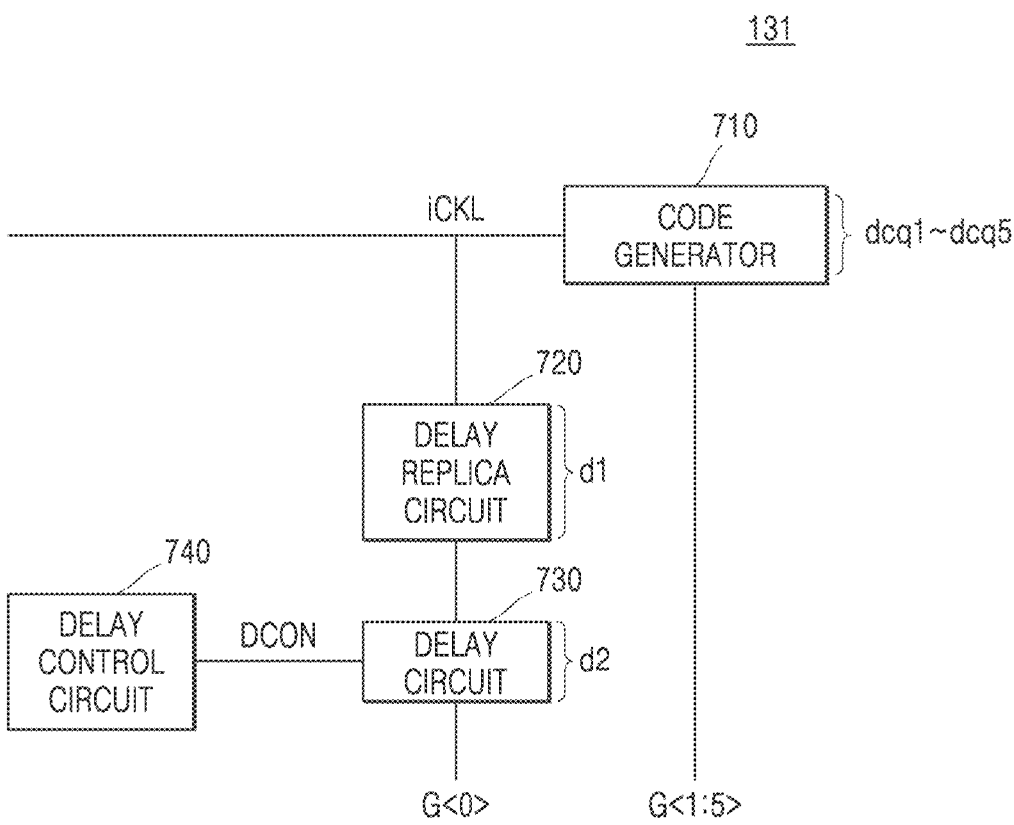
FIG. 6 is a diagram explaining a gray code generator according to some example embodiments.
Figure 7:
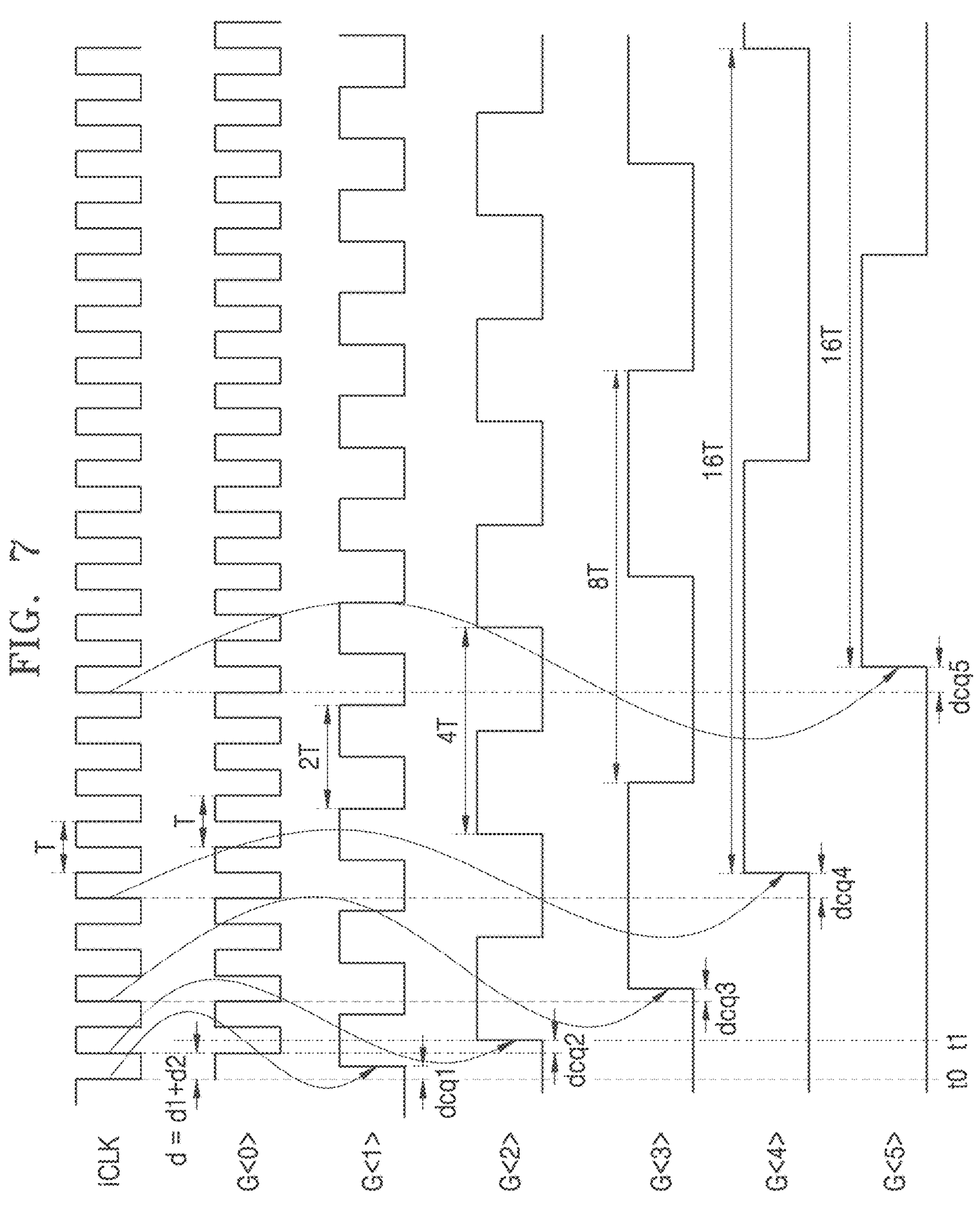
FIG. 7 is a timing diagram explaining a gray code signal according to some example embodiments.

FIG. 6 is a diagram explaining the gray code generator 131 according to some example embodiments. FIG. 7 is a timing diagram explaining a gray code signal according to some example embodiments.

Referring to FIG. 6, the gray code generator 131 may include a code generator 710, a delay replica circuit 720, a delay circuit 730, and a delay control circuit 740. The gray code generator 131 may generate first to sixth gray code signals G<0:5> based on an input clock signal iCLK. The input clock signal iCLK may be generated by a phase lock loop (PLL) included in the controller 150 or the ADC 130 of FIG. 1. However, the present embodiment is not limited thereto, and a PLL may be included within the gray code generator 131. In some example embodiments, the input clock signal iCLK may be generated by a divider dividing a clock signal generated by a PLL. The divider may be included in one of the gray code generator 131, the ADC 130, or the controller 150.

The code generator 710 may generate second to sixth gray code signals G<1:5> based on the input clock signal iCLK. The code generator 710 may generate the second to sixth gray code signals G<1:5> in response to different edges of the input clock signal iCLK. For example, the code generator 710 may generate the second gray code signal G<1> in response to a falling edge of the input clock signal iCLK. The code generator 710 may generate the third to sixth gray code signals G<2:5> in response to different rising edges of the input clock signal iCLK. Periods of at least two of the second to sixth gray code signals G<1:5> may be different from each other. For example, the period of the second gray code signal G<1> may be twice that of the input clock signal iCLK, the period of the third gray code signal G<2> may be four times that of the input clock signal iCLK, the period of the fourth gray code signal G<3> may be eight times that of the input clock signal iCLK, the period of the fifth gray code signal G<4> may be 16 times that of the input clock signal iCLK, and the period of the sixth gray code signal G<5> may be 16 times that of the input clock signal iCLK. The code generator 710 may include at least one of a flip-flop, a NAND operation circuit, and an XOR operation circuit. The delay time deq1 to deq5 may be provided to each second to sixth gray code signals G<1:5> by the code generator 710. The delay replica circuit 720 may provide a delay time d1. The first gray code signal G<0> and the second to sixth gray code signals G<1:5> may be synchronized through the delay replica circuit 720. The delay time d1 may have substantially the same or the same value as one of the delay times deq1 to deq5.

The delay control circuit 740 may generate a delay control signal DCON and provide the delay control signal DCON to the delay circuit 730. The delay control circuit 740 may generate a delay control signal DCON so that the delay circuit 730 provides a delay time d2 corresponding to ¼ of the period of the input clock signal iCLK. The delay control circuit 740 may be implemented as a delay-lock loop, and the delay circuit 730 may be implemented as a delay cell.

Referring to FIG. 7, the period of the input clock signal iCLK may be T.

The period of the first gray code signal G<0> is T and may have a delay time d compared to the input clock signal iCLK. The delay time d may be the sum of the delay time d1 and the delay time d2. The delay time d2 may be a time corresponding to T/4.

The period of the second gray code signal G<1> may be 2T. A rising edge and falling edge of the second gray code signal G<1> may be aligned with edges of the input clock signal iCLK with a delay time dcq1.

The period of the third gray code signal G<2> may be 4T. A rising edge of the third gray code signal G<2> may be aligned with the $4k^{th}$ (k is a natural number) rising edges among the rising edges of the input clock signal iCLK with a delay time dcq2. A falling edge of the third gray code signal G<2> may be aligned with $4k+2^{th}$ (k is a non-negative integer) rising edges among the rising edges of the input clock signal iCLK with a delay time dcq2.

The period of the fourth gray code signal G<3> may be 8T. A rising edge of the fourth gray code signal G<3> may be aligned with the $8k^{th}$ (k is a natural number) rising edges among the rising edges of the input clock signal iCLK with a delay time dcq3. A falling edge of the fourth gray code signal G<3> may be aligned with the $8k+4^{th}$ (k is a non-negative integer) rising edges among the rising edges of the input clock signal iCLK with a delay time dcq3.

The period of the fifth gray code signal G<4> may be 16T. A rising edge of the fifth gray code signal G<4> may be aligned with the $16k^{th}$ (k is a natural number) rising edges among the rising edges of the input clock signal iCLK with a delay time dcq4. A falling edge of the fifth gray code signal G<4> may be aligned with the $16k+8^{th}$ (k is a non-negative integer) rising edges among the rising edges of the input clock signal iCLK with a delay time dcq4.

The period of the sixth gray code signal G<5> may be 16T. A rising edge of the 6th gray code signal G<5> may be aligned with the $16k^{th}$ (k is a natural number) edges among the rising edges of the input clock signal iCLK with a delay time dcq5. A falling edge of the fourth gray code signal G<3> may be aligned with the $8k+4^{th}$ (k is a non-negative integer) rising edges among the rising edges of the input clock signal iCLK with a delay time dcq3. The rising edges of the input clock signal iCLK aligned with the rising edge and falling edge of the sixth gray code signal G<5> may be different from the rising edges of the input clock signal iCLK aligned with the rising edge and falling edge of the fifth gray code signal G<4>. Referring to FIG. 7, if the first to sixth gray code signals G<0:5> are sampled at time t0, a count value of 000001 may be obtained. If the first to sixth gray code signals G<0:5> are sampled at immediately before time t1, a count value of 000010 may be obtained. That is, according to some example embodiments, the counting speed may be improved and/or the resolution of the count value may be improved by adding a first gray code signal G<0> having the period of the input clock signal iCLK and a delay time equal to T/4 without adding a gray code signal having a period longer than or equal to the sixth gray code signal G<5>.

Figure 8A:
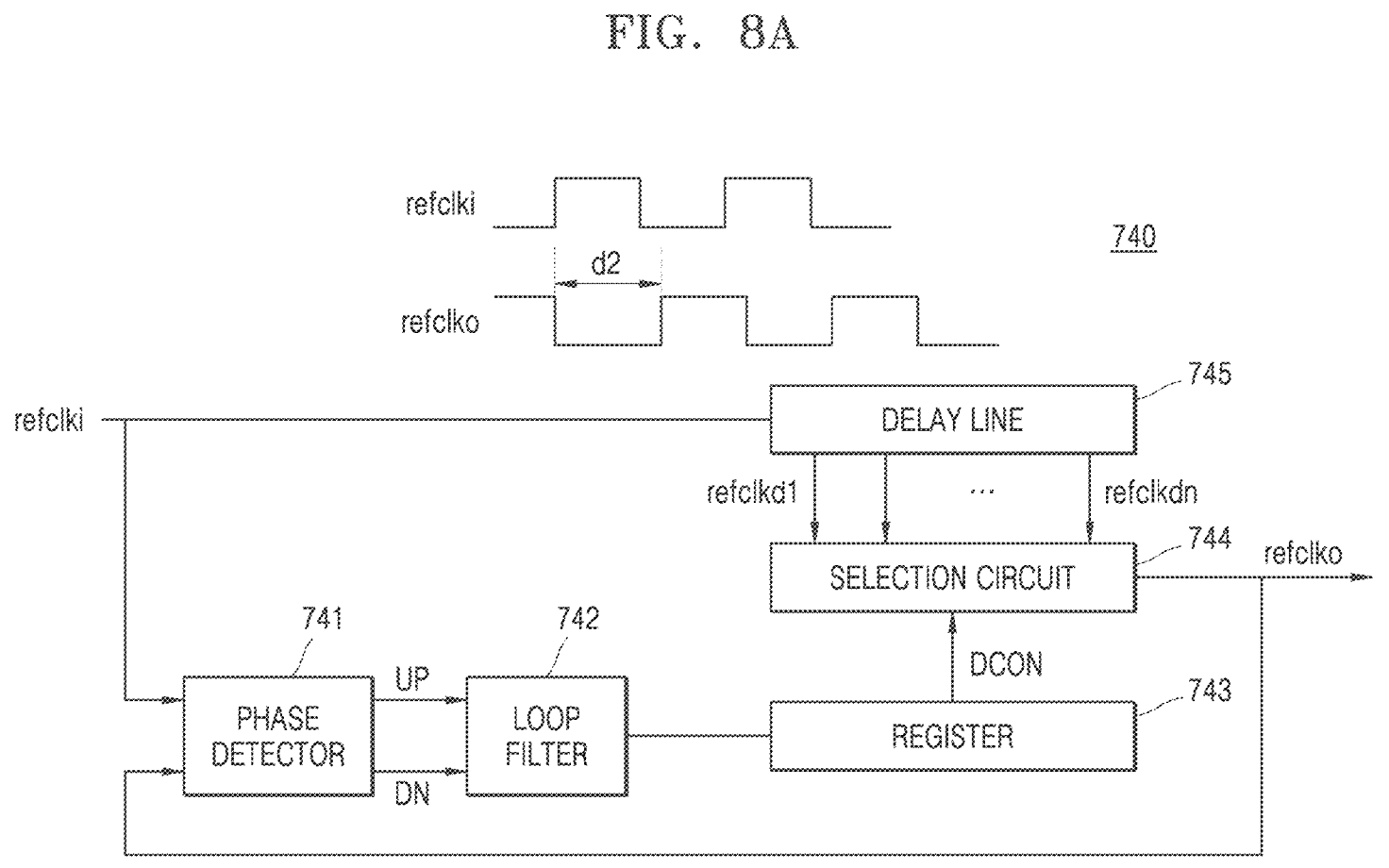
Figure 8B:
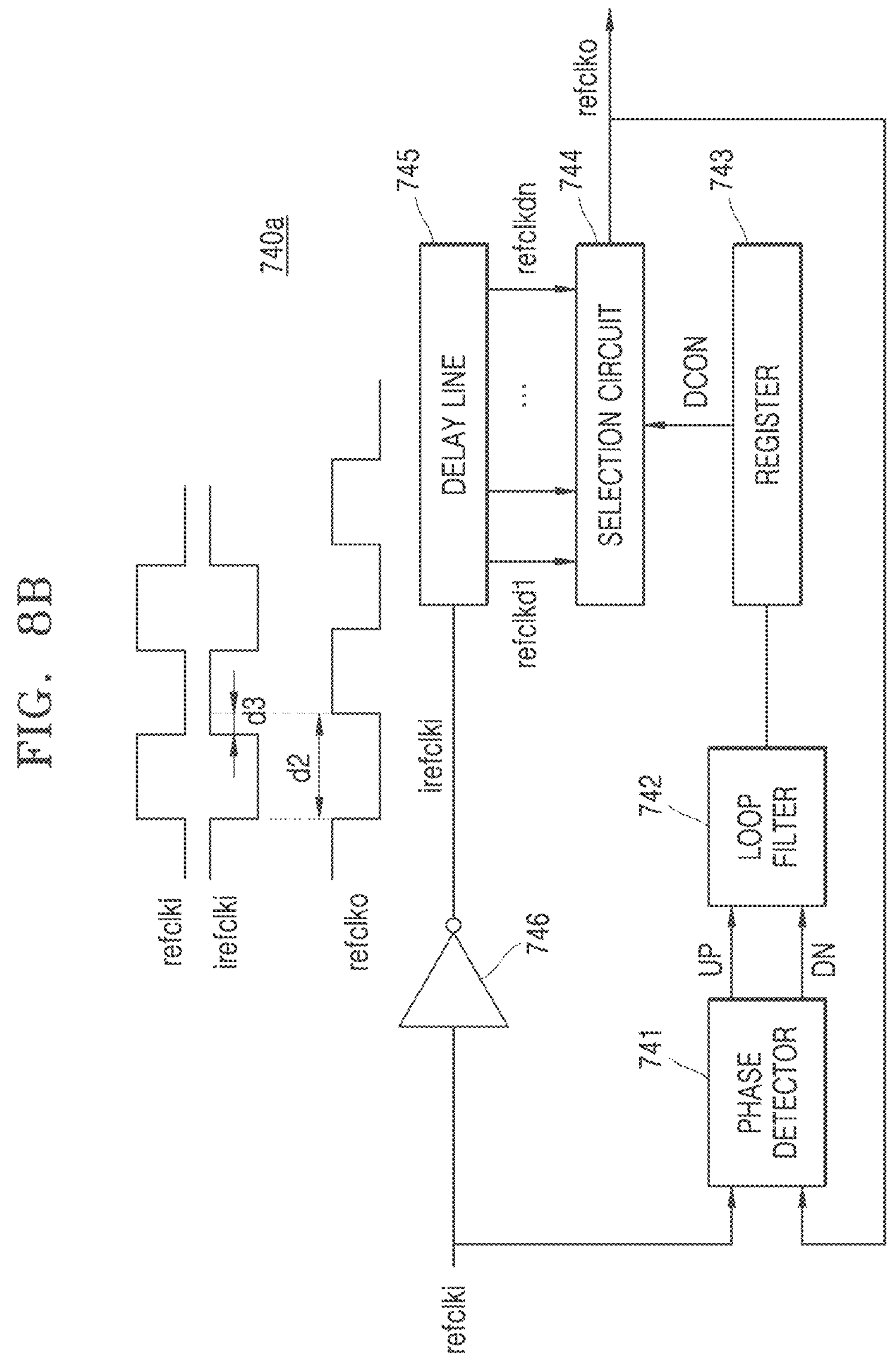

FIGS. 8A and 8B are diagrams explaining the delay control circuit 740 according to some example embodiments.

Referring to FIG. 8A, the delay control circuit 740 may include a phase detector 741, a loop filter 742, a register 743, a selection circuit 744, and a delay line 745.

The delay line 745 may receive an input reference clock signal refclki and delay the input reference clock signal refclki. The delay line 745 may generate first to $n^{th}$ delay reference clock signals (refclkd1 to refclkdn) by delaying the input reference clock signal refclki by various delay times. The delay line 745 may be referred to as a delay cell.

The selection circuit 744 may generate an output reference clock signal refclko by selecting one of the first to $n^{th}$ delay reference clock signals refclkd1 to refclkdn based on the delay control signal DCON. The delay control signal DCON may be an initially preset (or, alternatively, desired or generated) value.

The phase detector 741 may activate one of a delay increase signal UP and a delay decrease signal DN based on a width of a phase difference between the input reference clock signal refclki and the output reference clock signal refclko.

The loop filter 742 may determine a signal level based on the delay increase signal UP and the delay decrease signal DN and store a register value corresponding to the signal level in the register 743. The register value stored in the register 743 may be output to the selection circuit 744 as an N-bit delay control signal DCON.

If a phase difference between the input reference clock signal refelki and the output reference clock signal refelko is fixed, e.g., if locking is completed, a delay time between the input reference clock signal refclki and the output reference clock signal refelko may be d2.

The delay control signal DCON that provides the delay time d2 may be provided to the delay circuit 730 of FIG. 6. For example, the delay time d2 may correspond to ¼ of the period T of the input clock signal iCLK of FIG. 7. The period of the input reference clock signal refclki may be longer than the period of the input clock signal iCLK, but example embodiments are not limited thereto.

Referring to FIG. 8B, the delay control circuit 740*a* may further include an inverter 746. The inverter 746 may generate an inverted input reference clock signal irefelki by inverting the input reference clock signal refelki. If the locking is completed, a delay time between the input reference clock signal refclki and the output reference clock signal refclko may be d2, and a delay time between the inverted input reference clock signal irefelki and the output reference clock signal refclko may be d3. Referring to FIG. 8B, because d3 is a shorter delay time than d2, a locking time that fixes the delay time between the input reference clock signal refclki and the output reference clock signal refclko to d2 may be shorter than a locking time that fixes the delay time between the input reference clock signal refelki and the output reference clock signal refclko to d2. Therefore, the inverter 746 may shorten the locking time by providing the inverted input reference clock signal irefelki to the delay line 745.

Figure 9:
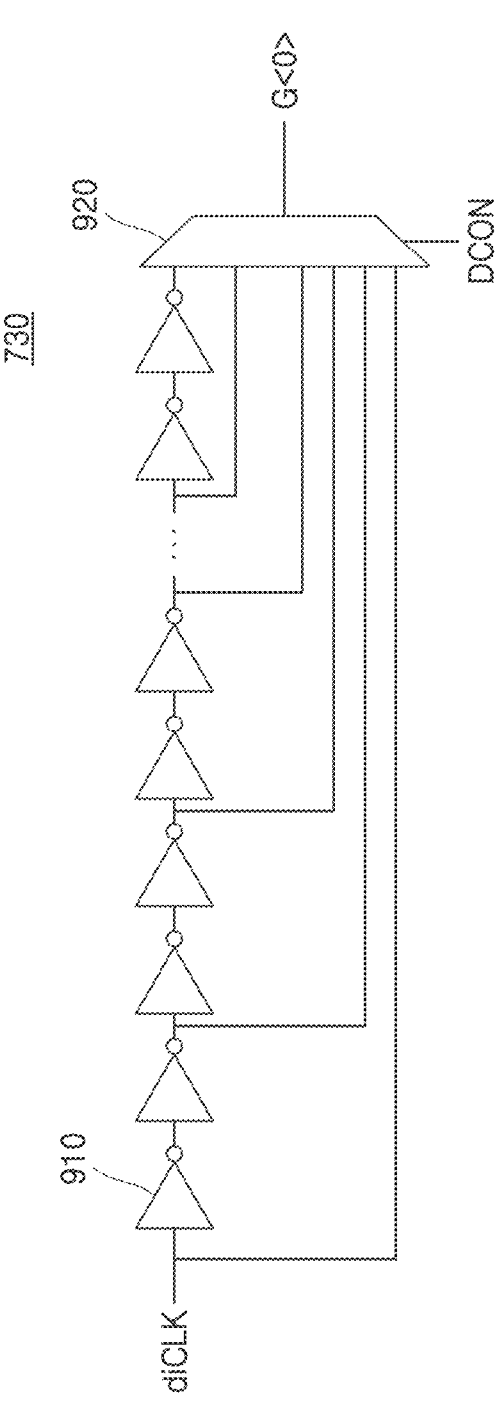
FIG. 9 is a diagram explaining a delay circuit according to some example embodiments.

FIG. 9 is a diagram explaining a delay circuit according to some example embodiments.

Referring to FIG. 9, the delay circuit 730 may include a plurality of delay cells 910 and a selection circuit 920. The plurality of delay cells 910 may constitute a delay line. The number of delay cells 910 included in the delay line is not limited thereto. For example, the number of delay cells 910 may be the same as the number of delay cells included in the delay line 745 of the delay control circuit 740*a* of FIG. 8.

The delay circuit 730 may receive a delayed input clock signal diCLK from the delay replica circuit 720. Specifically, the delay replica circuit 720 may generate a delayed input clock signal diCLK by delaying the input clock signal iCLK by a delay time d1.

The signals delayed by the plurality of delay cells 910 may be provided to the selection circuit 920.

The delay circuit 730 may receive a delay control signal DCON from the delay control circuit 740 (hereafter, delay control circuit 740 may refer to one or both of delay control circuit 740 and delay control circuit 740*a*).

The selection circuit 920 may generate a first gray code signal G<0> by selecting one of the delayed signals based on the delay control signal DCON.

As described above with reference to FIGS. 8A and 8B, a delay time of d2 may be provided by the delay control signal DCON, and, for example, the d2 may be a time corresponding to ¼ of the period T of the input clock signal iCLK. Therefore, a delay time between the delayed input clock signal diCLK and the first gray code signal G<0> may be fixed to ¼T. As such, because the delay control circuit 740 fixes the delay time in a DLL method, the delay circuit 730 according to some example embodiments may stably generate a first gray code signal G<0> having a delay time of ¼T even in a temporary voltage drop or unstable power situation.

Figure 10A:
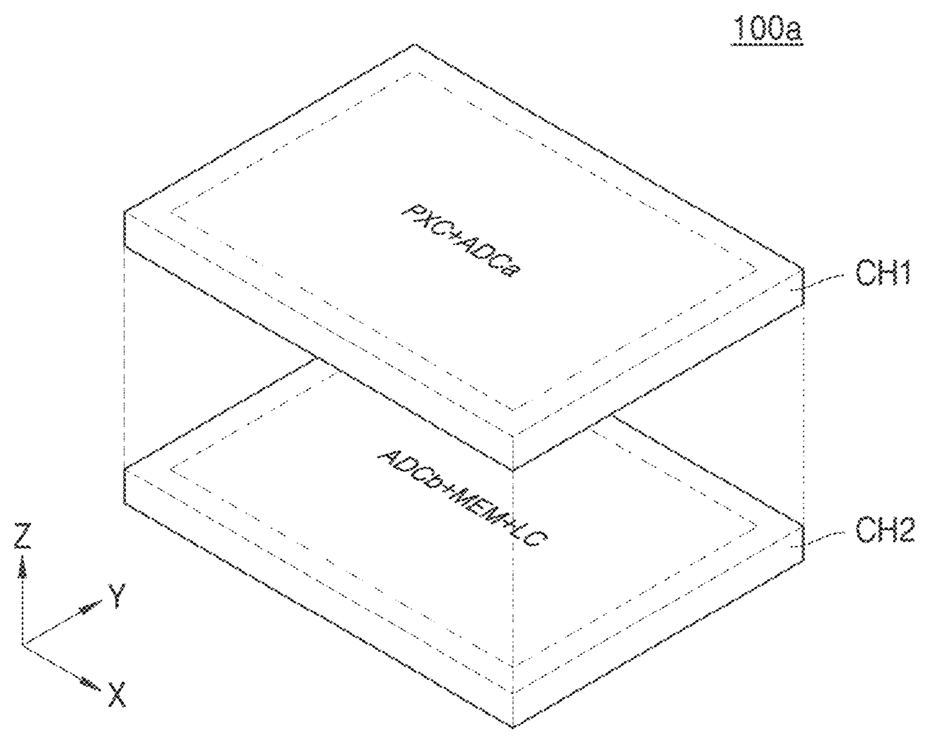
FIGS. 10A and 10B illustrate a stack structure of an image sensor according to some example embodiments.
Figure 10B:
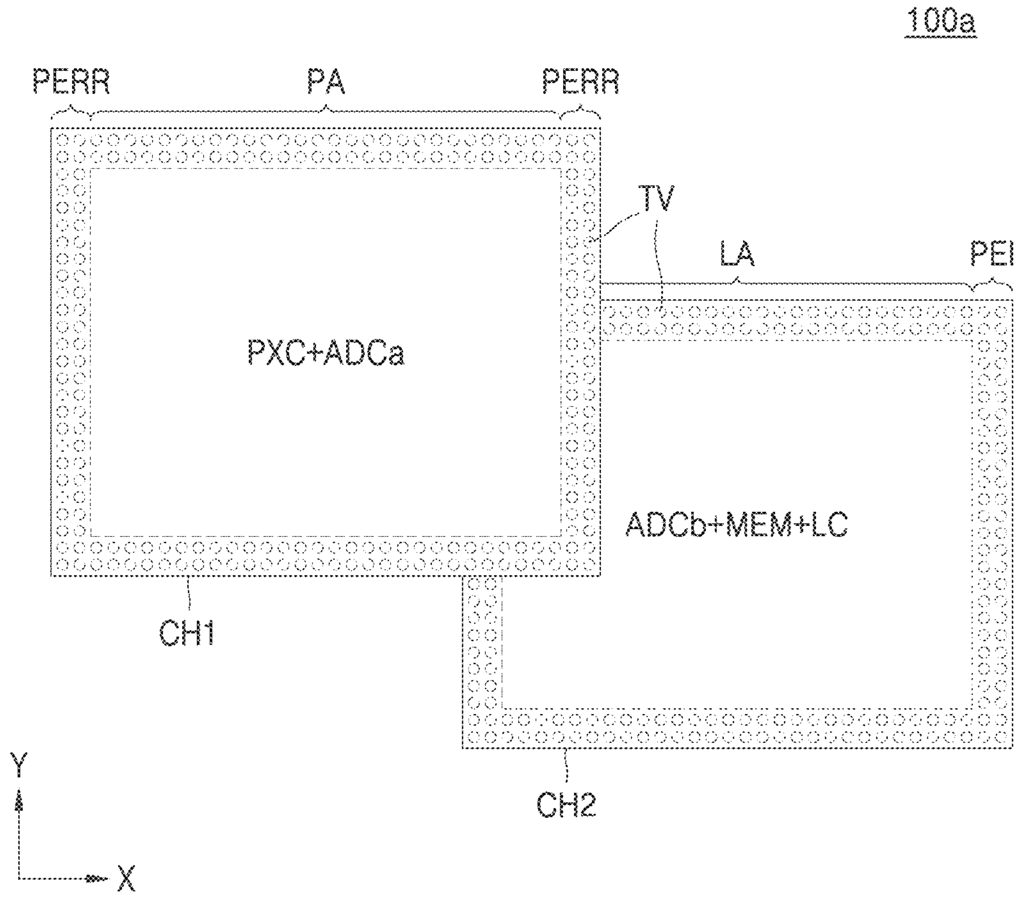

FIGS. 10A and 10B illustrate a stack structure of an image sensor 100*a* according to some example embodiments. FIG. 10A is an exploded perspective view of the image sensor 100*a*, and FIG. 10B is a plan view of the image sensor 100*a*.

Referring to FIGS. 10A and 10B, the image sensor 100*a* may have a structure in which a first chip CH1 and a second chip CH2 are stacked. A pixel core (e.g. at least one photodiode and pixel circuit) PXC included in a pixel array (for example, 110 of FIG. 1) and a part ADCa of the ADC (for example, 130 of FIG. 1) may be formed in the first chip CH1, and a remaining part ADCb of the ADC (for example, 130 of FIG. 1), the memory MEM (for example, 140 of FIG. 4), and a logic circuit LC (e.g., the controller 150 of FIG. 1) may be formed in the second chip CH2. For example, the ADC may be implemented with a PMOS (p-channel Metal Oxide Semiconductor Field Effect Transistor (MOSFET)) and an NMOS (n-channel MOSFET), and one of the PMOS and the NMOS may be placed on the first chip CH1 and the other may be placed on the second chip CH2. The first chip CH1 may be stacked on the second chip CH2.

As shown in FIG. 10B, the first chip CH1 and the second chip CH2 may be placed in the center, each include a pixel region PA and a logic region LA corresponding to an active region, and also include peripheral regions PERR and PEI placed on the periphery of the first chip CH1 and the second chip CH2. A portion of pixel cores PXC and ADCs may be placed in a two-dimensional array structure in the pixel region PA of the first chip CH1. In a logic region LA of the second chip CH2, the remaining portion of the ADC and memory MEM may be arranged in a two-dimensional array structure, and the logic circuit LC may also be arranged.

Through vias TV extending in a third direction (z direction) may be arranged in the peripheral regions PERR and PEI of the first chip CH1 and the second chip CH2. The first chip CH1 and the second chip CH2 may be electrically coupled to each other through the through vias TV. In the peripheral region PERR of the first chip CH1, wirings and vertical contacts extending in a first direction (x direction) or a second direction (y direction) may further be formed. The remaining portion of the ADC, the memory MEM, and the logic circuits LC may be arranged in a lower part of the second chip CH2 in the third direction (z direction), and a wiring layer may be arranged in an upper part of the second chip CH2. A plurality of wiring lines extending in the first direction (x direction) and the second direction (y direction) may also be arranged on the wiring layer of the second chip CH2, and these wiring lines may be connected to the remaining portions of the ADC, the memory MEM, and the logic circuits LC.

It has been described that a structure in which the first chip CH1 and the second chip CH2 are electrically coupled through through-vias TV but is not limited thereto. For example, the first chip CH1 and the second chip CH2 may be implemented in various coupling structures, such as Cu—Cu bonding, coupling of a through-via and a Cu pad, coupling of a through-via and an external connection terminal, and/or coupling through an integral through-via.

Figure 11:
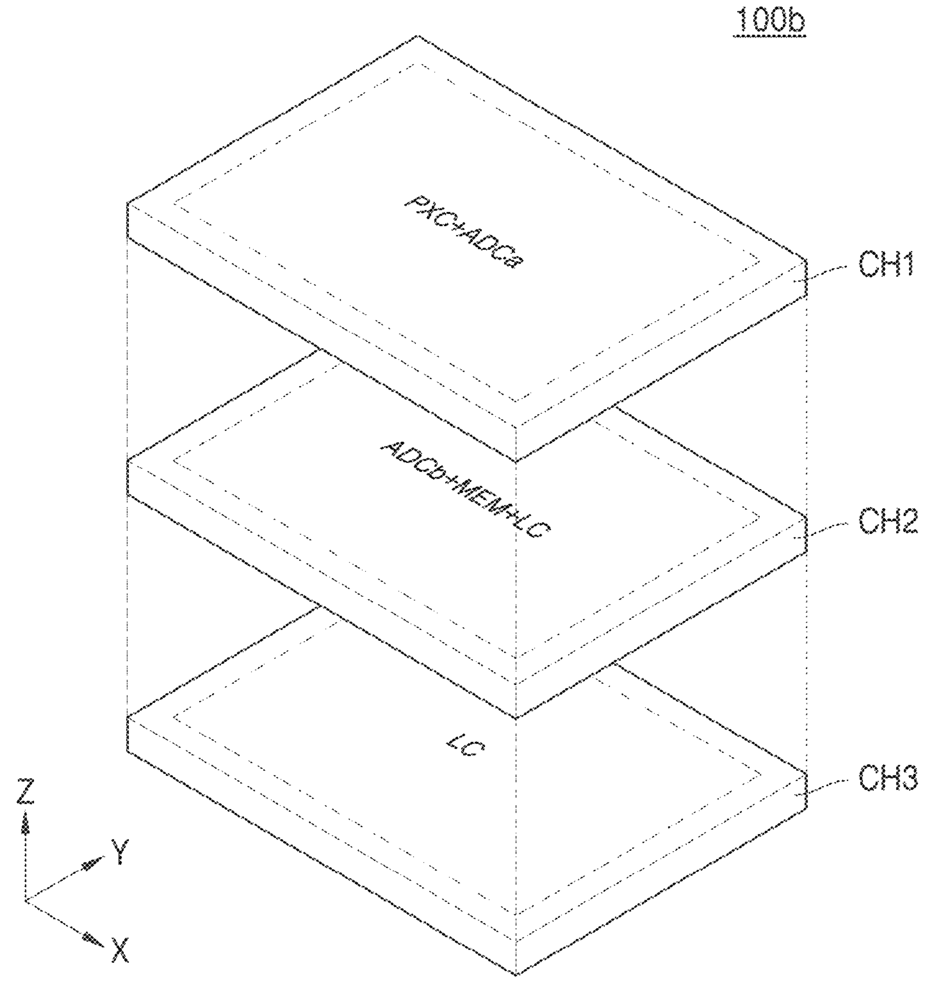
FIG. 11 illustrates a stack structure of an image sensor according to some example embodiments.

FIG. 11 illustrates a stack structure of an image sensor 100*b* according to some example embodiments.

Referring to FIG. 11, the image sensor 100*b* may have a structure in which a first chip CH1, a second chip CH2, and a third chip CH3 are stacked. In the first chip CH1, pixel cores (e.g., at least one photodiode and pixel circuit) PXC of a plurality of pixels PX included in the pixel array (e.g., 110 of FIG. 1) and ADCa are formed in a two-dimensional array structure, and in the second chip CH2, ADCb and memories MEM may be formed in a two-dimensional array structure. In some example embodiments, logic circuit LC may be formed at least partially in the second chip CH2. In addition, a logic circuit LC may be formed at least partially in the third chip CH3.

As described with reference to FIGS. 10A and 10B, the first chip CH1, the second chip CH2, and the third chip CH3 may be electrically coupled to each other through through-vias formed in peripheral regions arranged on the outside the chips, and, as another example, may be electrically coupled to each other through Cu—Cu bonding, bonding of a through-via and a Cu pad, bonding of a through-via and an external connection terminal, or an integral through-via.

Although the image sensors 100$a$ and 100$b$ having a two-layer structure or a three-layer structure have been described with reference to FIGS. 10A, 10B, and 11, the structures of the image sensors 100$a$ and 100$b$ are not limited thereto. For example, the image sensor may have a four-layer structure including a first chip to a fourth chip, and pixel cores, ADCs, memories, and logic circuits may be formed from the first chip located at the top to the fourth chip.

Figure 12:
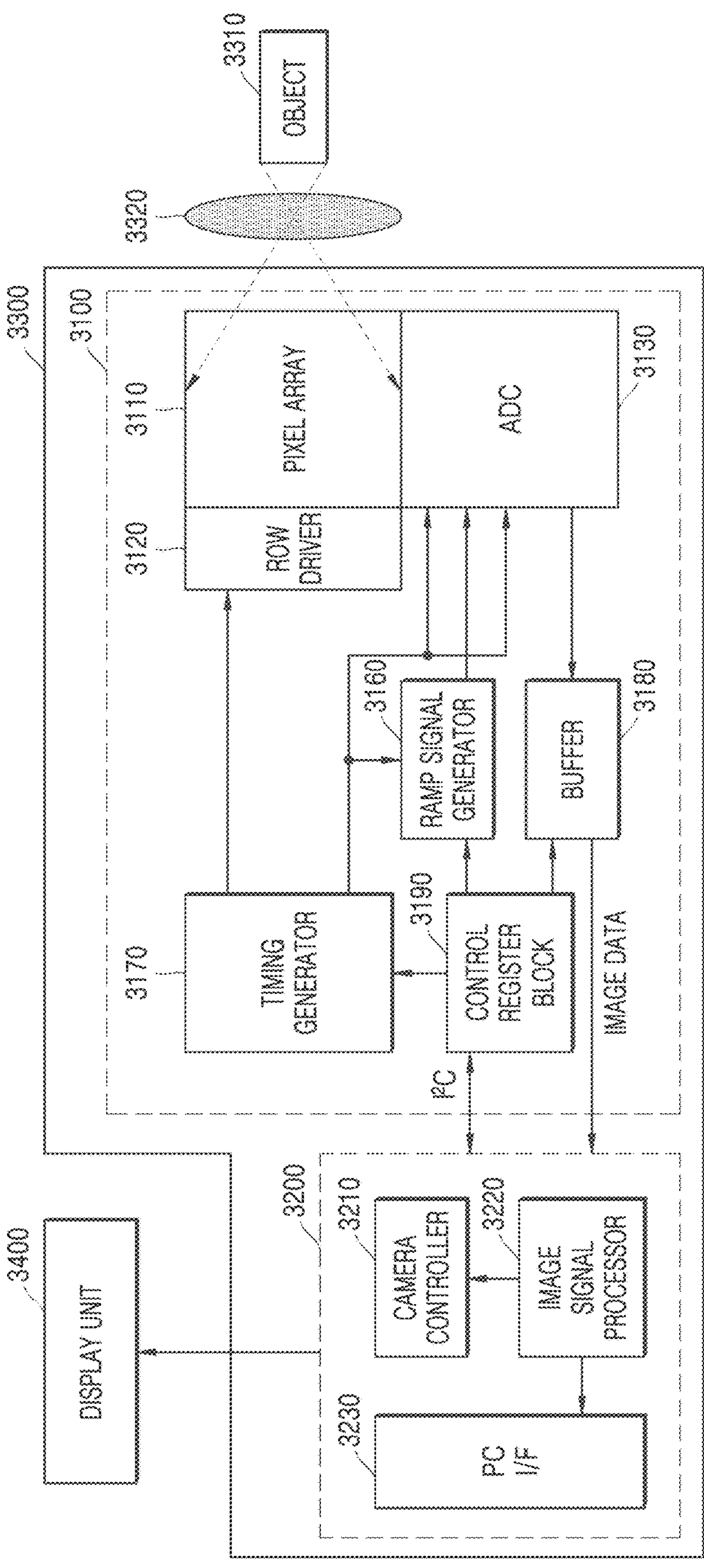
FIG. 12 is a block diagram illustrating an image processing system according to some example embodiments.

FIG. 12 is a block diagram showing an image process system 3000 according to some example embodiments.

Referring to FIG. 12, the image process system 3000 according to some example embodiments may include an image sensor 3100, an image processor (DSP) 3200, a display unit 3400, and a lens 3320.

The image sensor 3100 may include a pixel array 3110, a row driver 3120, an ADC 3130, a ramp signal generator 3160, a timing generator 3170, a control register block 3190, and a buffer 3180. The row driver 3120 corresponds to the row decoder 120 of FIG. 1, the ADC 3130 corresponds to the ADC 130 of FIG. 1, the ramp signal generator 3160 corresponds to the ramp signal generator 132 of FIG. 4, the buffer 3180 corresponds to the output buffer 140 of FIG. 1, and the timing generator 3170 and the control register block 3190 correspond to the controller 150 of FIG. 1.

The image sensor 3100 may sense an object 3310 captured through the lens 3320 under the control of the DSP 3200, and the DSP 3200 may output an image sensed and output by the image sensor 3100 to the display unit 3400 and/or to the a memory device (not shown). At this time, the display unit 3400 includes all devices capable of outputting an image. For example, the display unit 3400 may include a computer, a mobile phone, and other image output terminals.

The DSP 3200 may include a camera controller 3210, an image signal processor 3220, and a PC I/F 3230. The camera controller 3210 may control the control register block 3190. In some example embodiments, the camera controller 3210 may control the image sensor 3100, e.g., the control register block 3190 using an inter-integrated circuit (I2C) but is not limited thereto. Various interfaces may be applied between the camera controller 3210 and the control register block 3190.

The image signal processor 3220 may receive image data, which is an output signal of the buffer 3180, process the image to be easily viewed by a person, and output the processed image to the display unit 3400. Although it is depicted that the image signal processor 3220 is located inside the DSP 3200, it is not limited thereto, and the image signal processor 3220 may be located inside the image sensor 3100.

As the image sensor 3100, the image sensor 100 described with reference to FIG. 1 may be applied. The control register block 3190 may control operations by outputting a control signal to each of the ramp signal generator 3160, the timing generator 3170, and the buffer 3180. At this time, the control register block 3190 may operate under the control of the camera controller 3210. As such, the image sensor 100 may output image data which may be displayed and/or stored as discussed in relation to the image sensor 3100.

The ADC 3130 may include the gray code generator 131, and the gray code generator 131 may generate a first gray code signal G<0> by delaying an input clock signal iCLK by ¼ of T, which is the period of the input clock signal iCLK. By generating a count value using a gray code signal having substantially the same or the same period as the input clock signal iCLK, the counting speed may be improved, and/or the resolution of the count value may be improved. Furthermore, the gray code generator 131 may include the delay control circuit 740. Because the delay control circuit 740 generates a delay control signal DCON so that a time corresponding to ¼T is constantly delayed, the period and delay time of the first gray code signal G<0> may be fixed and/or improve even if a temporary voltage drop occurs.

Any or all of the elements described with reference to the figures may communicate with any or all other elements described with reference to figures. For example, any element may engage in one-way and/or two-way and/or broadcast communication with any or all other elements in the figures, to transfer and/or exchange and/or receive information such as but not limited to data and/or commands, in a manner such as in a serial and/or parallel manner, via a bus such as a wireless and/or a wired bus (not illustrated). The information may be in encoded various formats, such as in an analog format and/or in a digital format.

When the terms "about" or "substantially" are used in this specification in connection with a numerical value, it is intended that the associated numerical value includes a manufacturing or operational tolerance (e.g., ±10%) around the stated numerical value. Moreover, when the words "generally" and "substantially" are used in connection with geometric shapes, it is intended that precision of the geometric shape is not required but that latitude for the shape is within the scope of the disclosure. Further, regardless of whether numerical values or shapes are modified as "about" or "substantially," it will be understood that these values and shapes should be construed as including a manufacturing or operational tolerance (e.g., ±10%) around the stated numerical values or shapes.

As described herein, any electronic devices and/or portions thereof according to any of the example embodiments may include, may be included in, and/or may be implemented by one or more instances of processing circuitry such as hardware including logic circuits; a hardware/software combination such as a processor executing software; or any combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device (e.g., a memory), for example a DRAM device, storing a program of instructions, and a processor (e.g., CPU) configured to execute the program of instructions to implement the functionality and/or methods performed by some or all of any devices, systems, modules, units, controllers, circuits, architectures, and/or portions thereof according to any of the example embodiments, and/or any portions thereof.

While the inventive concepts have been particularly shown and described with reference to some example embodiments thereof, it will be understood that various changes in form and details may be made therein without departing from the spirit and scope of the following claims.

What is claimed is:

1. An image sensor comprising:

a pixel array configured to output a pixel signal;

a detection circuit configured to determine a comparison result signal based on a reference signal and the pixel signal and output the comparison result signal;

a gray code generator configured to generate a plurality of gray code signals based on an input clock signal; and a counter circuit configured to output a digital count result signal by counting the comparison result signal based on the plurality of gray code signals, the gray code generator including a delay circuit configured to generate a first gray code signal among the plurality of gray code signals by delaying the input clock signal;

a code generator configured to generate a plurality of second gray code signals having a different period from the first gray code signal among the plurality of gray code signals based on the input clock signal; and a delay control circuit configured to provide a delay control signal controlling a delay time of the input clock signal to the delay circuit.

2. The image sensor of claim 1, further comprising a replica circuit configured to receive the input clock signal, delay the input clock signal by the delay time generated by the code generator, and provide the delayed input clock signal to the delay circuit.

3. The image sensor of claim 2, wherein the delay control circuit is further configured to generate the delay control signal such that a delay time between the delayed input clock signal and the first gray code signal is ¼ of a period of the input clock signal.

4. The image sensor of claim 2, wherein the replica circuit is further configured to generate the delayed input clock signal by delaying the input clock signal by the delay time corresponding to one of delay times between the input clock signal and the plurality of second gray code signals.

5. The image sensor of claim 1, wherein a period of the input clock signal is same as a period of the first gray code signal.

6. The image sensor of claim 1, wherein the delay control circuit includes:

a first delay line configured to generate a plurality of delay reference clock signals having various delay times based on an input reference clock signal;

a selection circuit configured to select one of the plurality of delay reference clock signals based on the delay control signal;

a phase detector configured to detect a phase difference between the selected delay reference clock signal and the input reference clock signal;

a loop filter configured to change a signal level indicated by the delay control signal based on the phase difference; and a register configured to store a register value corresponding to the signal level as the delay control signal.

7. The image sensor of claim 6, wherein the delay control circuit includes an inverter circuit that generates an inverted input reference clock signal by inverting the input reference clock signal and provides the inverted input reference clock signal to the first delay line.

8. The image sensor of claim 6, wherein the delay circuit includes a second delay line configured to generate a plurality of delay signals for the input clock signal; and a selection circuit configured to generate the first gray code signal by selecting one of the plurality of delay signals based on the delay control signal.

9. The image sensor of claim 6, wherein a delay time between the selected delay reference clock signal and the input reference clock signal is same as the delay time of the input clock signal.

10. An analog-digital converter comprising:

a gray code generator configured to generate a first gray code signal and a plurality of second gray code signals; and a counter circuit configured to output a digital count result signal by counting a comparison result signal between a pixel signal and a reference signal based on the first gray code signal and the plurality of second gray code signals, the gray code generator including a delay circuit configured to generate the first gray code signal by delaying an input clock signal;

a code generator configured to generate the plurality of second gray code signals having different periods from the first gray code signal based on the input clock signal; and a delay control circuit configured to provide a delay control signal for controlling a delay time of the input clock signal to the delay circuit.

11. The analog-digital converter of claim 10, further comprising:

a replica circuit configured to receive the input clock signal, delay the input clock signal by the delay time generated by the code generator, and provide the delayed input clock signal to the delay circuit.

12. The analog-digital converter of claim 11, wherein the delay control circuit is further configured to generate the delay control signal such that a delay time between the delayed input clock signal and the first gray code signal is ¼ of a period of the input clock signal.

13. The analog-digital converter of claim 11, wherein the replica circuit is further configured to generate the delayed input clock signal by delaying the input clock signal by the delay time corresponding to one of delay times between the input clock signal and the plurality of second gray code signals.

14. The analog-digital converter of claim 10, wherein a period of the input clock signal is same as a period of the first gray code signal.

15. The analog-digital converter of claim 10, wherein the delay control circuit includes:

a delay line configured to generate a plurality of delay reference clock signals having various delay times based on an input reference clock signal;

a selection circuit configured to select one of the plurality of delay reference clock signals based on the delay control signal;

a phase detector configured to detect a phase difference between the selected delay reference clock signal and the input reference clock signal;

a loop filter configured to change a signal level indicated by the delay control signal based on the phase difference; and a register configured to store a register value corresponding to the signal level as the delay control signal.

16. The analog-digital converter of claim 15, wherein the delay circuit includes a delay line configured to generate a plurality of delay signals for the input clock signal; and a selection circuit configured to generate the first gray code signal by selecting one of the plurality of delay signals based on the delay control signal.

17. The analog-digital converter of claim 15, wherein a delay time between the selected delay reference clock signal and the input reference clock signal is a same time as the delay time of the input clock signal.

18. An image process system comprising:

an image sensor configured to generate a comparison result signal based on a pixel signal and a reference signal, generate a digital count result signal based on the comparison result signal, and output an image signal based on the digital count result signal; and an image processor configured to process the image signal, the image sensor further configured to generate an input clock signal, generate a delay control signal that controls a delay time of the input clock signal in a delay-locked loop manner, generate a first gray code signal by delaying the input clock signal based on the delay control signal, generate a plurality of second gray code signals having a different period from the first gray code signal based on the input clock signal, and generate the digital count result signal by counting the comparison result signal based on the first gray code signal and the plurality of second gray code signals.

19. The image process system of claim 18, wherein the image sensor is further configured to generate a first delayed input clock signal by delaying the input clock signal by a first delay time between the input clock signal and the plurality of second gray code signals, and generate the first gray code signal by delaying the first delayed input clock signal by a second delay time based on the delay control signal.

20. The image process system of claim 19, wherein the second delay time is ¼ of a period of the input clock signal.

* * * * *